Figure 1:
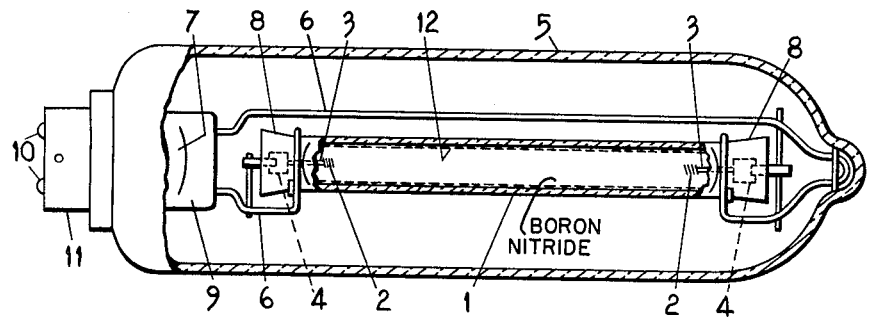

INVENTORS
RONALD ARTHUR LAURIE MASON
EVAN HERBERT NELSON
SYDNEY ALFRED RICHARD RIGDEN

ATTORNEYS

Nov. 23, 1965        R. A. L. MASON ETAL        3,219,868
                     ARTICLES OF FUSED SILICA
Filed Oct. 2, 1962                              2 Sheets-Sheet 2

INVENTORS
RONALD ARTHUR LAURIE MASON
EVAN HERBERT NELSON
SYDNEY ALFRED RICHARD RIGDEN
BY Kirschstein, Kirschstein & Ottinger
                    ATTORNEYS 3,219,868
ARTICLES OF FUSED SILICA
Ronald Arthur Laurie Mason, Langley, Evan Herbert Nelson, London, and Sydney Alfred Richard Rigden, Bushey Heath, England, assignors to The General Electric Company Limited, London, England
Filed Oct. 2, 1962, Ser. No. 227,852
Claims priority, application Great Britain, Oct. 13, 1961, 36,812/61
6 Claims. (Cl. 313—184)

This invention relates to articles formed at least partly of a body of fused silica and to the manufacture of such articles.

Fused silica has numerous uses, of which that with which the invention is particularly, although not exclusively, concerned is for providing the discharge envelopes of electric discharge lamps. It has been found especially suitable for providing the envelopes of high pressure mercury vapour electric discharge lamps since it has a high melting point and is mechanically strong, so as to be capable of withstanding the temperatures and pressures attained in operation of such lamps. However, fused silica is readily attacked by alkali metal vapour, and this has prevented its use for at least some purposes in which it is exposed to such vapour. In particular it is not suitable for forming the envelopes of alkali metal vapour electric discharge lamps, for example sodium vapour lamps, since the attack by the hot alkali metal vapour in use leads to a rapid blackening of the envelope and a consequent deterioration in its light transmissive properties.

According now to one aspect of the present invention, in an article formed at least partly of a body of fused silica, the said body is coated over part at least of its surface with a film of boron nitride.

We have found that such a film is relatively resistant to attack by alkali metal vapour compared with fused silica and is also strongly adherent to the surface of fused silica, the film thus forming a protective coating which reduces the attack of alkali metal vapour on the underlying silica surface when exposed to such vapour and renders possible the use of fused silica for at least some purposes for which it has not hitherto been deemed suitable.

The film should, of course, be continuous, i.e. free from pinholes and other interstices through which the metal vapour could penetrate to the surface of the silica.

The degree of protection will, in general, increase as the thickness of the film is increased, although there will usually be an upper limit to the thickness of the film usable in practice, owing to the tendency of excessively thick films to peel away from the surface of the silica; however an appreciable degree of protection of the fused silica will in most cases be obtained with films having a thickness which is considerably lower than that at which peeling tends to occur and the most satisfactory film thickness for any particular application of the invention may readily be found by trial.

Articles in accordance with the invention will in general have the silica body in the form of a hollow vessel or tube having its internal surface coated with a film of boron nitride, and the use of such a film for protecting the fused silica from attack by alkali metal vapour is especially advantageous in cases where the fused silica body is required to be highly transmissive to visible light, since such films are substantially transparent.

Thus according to a particular aspect of the invention, a metal vapour electric discharge lamp has a tubular discharge envelope of fused silica containing a pair of electrodes for the passage of the discharge and a quantity of alkali metal for providing at least part of the vapour filling in use of the lamp, and the inner surface of the envelope is coated with a film of boron nitride.

In particular, the invention renders possible the manufacture of metal vapour electric discharge lamps having a fused silica discharge envelope in which the metal filling consists of sodium, or sodium and mercury (usually together with a rare gas for initiating starting of the discharge) and having a useful life much longer than that obtained with similar lamps not having a protected silica surface. The lamps can be of the high (i.e. super atmospheric) pressure type, but the invention also renders it possible to use fused silica tubing for the envelopes of low pressure discharge lamps in place of the special and expensive "flashed" glass tubing (i.e. glass tubing provided with a thin internal layer of special alkali-resistant glass) now invariably used.

In the manufacture of an article in accordance with the invention, the boron nitride is conveniently applied by a vapour deposition process, for example by contacting the surface of the body, where the coating is to be formed, by the vapour of trichloroborazole ($B_3N_3H_3Cl_3$) whilst the surface is heated to a temperature sufficient to decompose the trichloroborazole vapour and leave a continuous film of boron nitride on said surface. The reaction should, of course, be carried out in an atmosphere which does not have a detrimental effect on the reaction, or on the formed film, for example in a rare gas, such as argon, of suitably high purity or in a space evacuated to a suitably low pressure, for example less than $10^{-2}$ millimetre mercury, and preferably about $10^{-3}$ millimetre mercury.

If the surface is maintained at too low a temperature the formation of a continuous boron nitride film will be prevented; on the other hand the temperature should not be so high that deformation of the fused silica body results, and we have found that with the reaction carried out in the presence of a non-reactive gas, for example argon, at approximately atmospheric pressure highly satisfactory boron nitride films can be formed with the surface of the fused silica body which is to be coated heated to a temperature of between 1200° to 1300° C.

At lower pressures it will usually be possible to form the boron nitride film with the silica body heated to a lower temperature, the most suitable temperature for any particular pressure being, however, readily ascertainable by trial.

The production of tricholoroborazole vapour is conveniently obtained by heating trichloroborazole crystals to an appropriate temperature, this depending upon the rate at which the vapour is required and on the pressure of the surrounding atmosphere.

Figure 2:
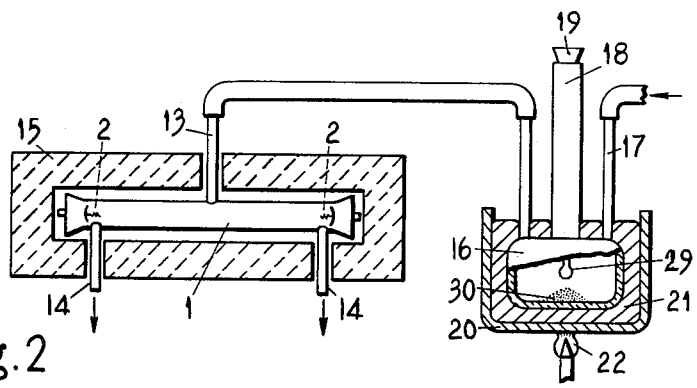
Figure 3:
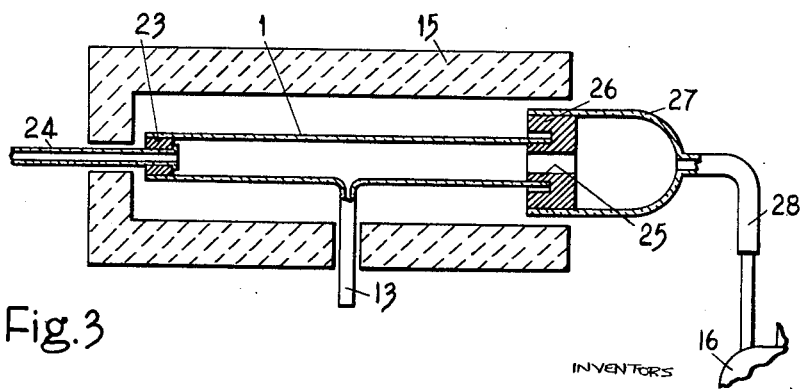
Figure 4:
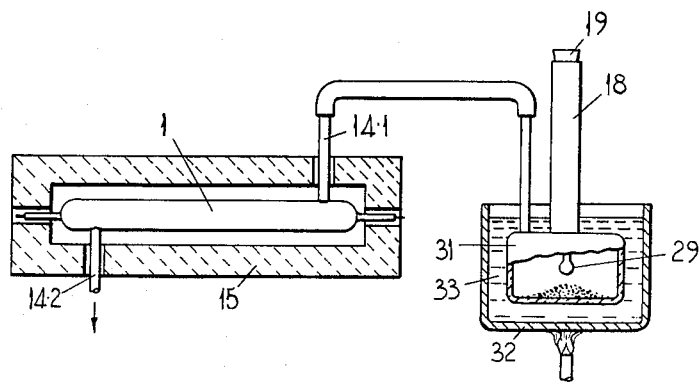

The application of the invention to a sodium vapour electric discharge lamp will now be described by way of example with reference to FIGURES 1 to 4 of the accompanying schematic drawing, in which FIGURE 1 represents a side view in part section of the lamp which has a discharge envelope of fused silica coated internally with a film of boron nitride, and FIGURES 2, 3 and 4 illustrate diagrammatically different methods of applying the film to the envelope.

Referring first to FIGURE 1, the lamp shown therein comprises a tubular fused silica discharge envelope 1 approximately 10 centimetres long and having an internal diameter of about 9 millimetres, the envelope containing a rare gas filling consisting of argon at a pressure of about 20 millimetres mercury, together with about 0.1 gram of sodium.

An electrode 2 in the form of a helix of tungsten wire mounted on a short tungsten rod 3, approximately 2 millimetres in diameter, is mounted at each end of the envelope, each rod being partly embedded in the end of the envelope which is pinched on to a molybdenum foil lead-in conductor 4 electrically connected to the rod. The length of the rods 3 is such that the inner ends of the electrodes project approximately 7 millimetres into the envelope from the adjacent closed ends, the electrodes carrying pellets of activating material (not shown) conveniently contained within a recess in the sides of the rods 3.

The envelope is supported within a cylindrical glass outer jacket 5, having an internal diameter of about 50 millimetres and closed at one end, by means of a pair of support wires 6, carried by a pinched foot-tube 7 closing the opposite end of the outer jacket, and each bent round the pinch 8 at a different end of the discharge envelope 1.

Each support wire 6 is connected to a respective molybdenum foil lead-in conductor 4 and extends outwards from the jacket through the pinch 9 of the foot-tube 7, being connected outside the jacket to the terminals 10 of a lamp cap 11 attached to the end of the jacket by means of a suitable cement.

The space between the discharge envelope and the outer jacket is highly evacuated for conserving the heat of the discharge so as to enable the envelope to reach and be maintained at an appropriately high operating temperature when the lamp is in use.

The lamp is designed to be operated with a nominal wattage dissipation of about 600 watts, the envelope temperature in normal operation being of the order of 800° C.

At such a temperature unprotected silica is rapidly attacked by sodium vapor, but this disadvantage is reduced in accordance with the invention by coating the inner surface of the discharge envelope with a protective film 12 of boron nitride.

In one method of forming the boron nitride film 12 the discharge envelope 1 with the electrodes 2 already sealed into the ends, and provided, as shown in FIGURE 2, with a pumping stem 13 extending from a central region of the envelope, and two similar stems 14 extending laterally from the envelope in the vicinity of the electrodes, is supported within an oven 15.

The pumping stem 13 is connected to a closed vessel 16 having an inlet tube 17 connected to a source (not shown) of substantially pure argon which, in particular, is free of water vapour. A wider tube 18 extends upwards from the vessel and is closed by a stopper 19 carrying a thermometer 29 projecting downwards into the main part of the vessel. The whole of the main part of the vessel is immersed in a bath 20 of molten Wood's metal 21 heated by a gas flame 22.

The ends of the stems 14 project from the oven 15 and are open to the atmosphere.

Argon is fed into the vessel 16 and thence through the envelope 1 via the pumping stem 13 at a rate of about 7.5 litres per minute, whilst the temperature of the vessel is raised to about 120° C.±5° C. and the oven 15 is heated to between 1400 and 1450° C. giving a temperature at the internal surface of the envelope of between 1200° and 1300° C. When the temperatures of the oven 15 and the vessel 16 are steady at the required values the stopper 19 is removed, about 1 gram of trichloroborazole crystals 30 is dropped into the vessel 16 and the stopper is replaced. The heat within the vessel causes the trichloroborazole to evaporate slowly, the vapour being carried into the envelope 1 by the stream of argon, the direction of which is indicated by the arrows.

The tube connecting the vessel 16 with the envelope 1 should be as short as practicable, and maintained at a temperature between that of the vessel and that at which decomposition of the trichloroborazole vapour takes place; auxiliary heating means (not shown) may be provided for heating the tube if necessary.

The temperature of the envelope 1 is such that the trichloroborazole vapour is decomposed within it and boron nitride is deposited as a continuous film on the inner surface of the envelope wall. After about four minutes, the vessel 16 is removed from the bath and allowed to cool whilst argon is still passed through it, the oven also being permitted to cool down to a temperature of about 250° C. the discharge envelope 1 with the internal film 12 of boron nitride then being removed from it.

The stems 14 are subsequently sealed off close to the envelope, and after the envelope has been evacuated the rare gas filling and the sodium are introduced into the envelope through the pumping stem 13 which is finally sealed off in the usual way.

The discharge envelope is then mounted within the outer jacket, the final processing of the lamp, including the evacuation of the jacket, being effected in accordance with known lamp manufacturing techniques.

A method of applying the boron nitride film 12 to the inner surface of the discharge envelope 1 before the electrodes are mounted within it is illustrated in FIGURE 3. In this method the open ended envelope, with a single pumping stem 13 projecting therefrom is supported within an oven 15, as shown, a carbon plug 23, having a narrower fused silica tube 24 extending through it, fitting into one end of the envelope and masking off a short length of the inner surface of the envelope at that end. The outer end of the tube 24 projects from the oven and is open to the atmosphere. The other end of the envelope 1 is fitted over a stub 25 forming part of a further carbon plug 26 of somewhat larger diameter than the envelope and which is fitted into the end of another fused silica tube 27 approximately 20 millimetres in diameter internally, a hole through the centre of the plug connecting the interiors of the tube 27 and the envelope. The stub 25 masks off a short length of the inner surface of the envelope in a similar manner to the plug 23. The end of the tube 27 remote from the envelope 1 is connected through a further tube 28 to a vessel 16 (only shown in part) which is similar to that illustrated in FIGURE 2 and which is similarly connected to a source of substantially pure argon.

In applying the boron nitride film to the inner surface of the envelope the oven 15 and the vessel 16 are heated as in the previous method whilst argon is passed through the vessel and the envelope at a rate of about 7.5 litres per minute, and when the temperature of the oven is steady at a value of between 1400 and 1450° C. and the vessel 16 has a steady temperature of about 120° C., 1 gram of trichloroborazole is dropped into the vessel as previously described, evaporation of the trichloroborazole taking place and the vapour being carried into the envelope by the stream of argon where it is decomposed and boron nitride formed as a coating on the inner surface of envelope wall, with the exception of the two masked regions at the ends of the envelope. After four minutes the vessel 16 and oven 15 are permitted to cool, the coated envelope being then taken from the oven and the plugs 23, 26 removed from its ends.

The electrodes are subsequently inserted into the ends of the envelope and the uncoated ends heated until soft and pinched on to the molybdenum foil lead-in conductors, a short length of the coated part of the envelope at each end also being pinched so that the boron nitride coating extends completely over the inner surface of the envelope.

The lamp is then completed as previously described.

In the third method, which is illustrated in FIGURE 4, the use of a current of argon is avoided. The lamp envelope 1, with the electrodes sealed into its ends as in the case of the method described with reference to FIGURE 2, is mounted in an oven 15, and a stem 14.1 extending from one end of the envelope is connected to a closed vessel 31 similar to the vessel 16 of FIGURE 2, the vessel 31 being similarly provided with an upwardlyextending tube 18, fitted with a stopper 19 carrying a thermometer 29, but the inlet tube 17 in this case being omitted. About 1 gram of trichloroborazole crystals 30 are placed in the vessel 31, which is then immersed in a bath 32 of water 33 and the stem 14.2 at the opposite end of the envelope connected to a vacuum pump reducing the pressure in the envelope 1 and the vessel 31 to approximately $10^{-3}$ millimetre mercury. The vessel 31 is brought to a temperature of about 60° C., the oven 15 also being heated to a temperature of approximately 1050° C. to give an internal envelope temperature of between 1000° C. and 1050° C., these temperatures then being maintained approximately constant. Trichloroborazole vapour from the crystals 30 is then carried into the envelope where it is decomposed and boron nitride deposited on the inner surface of the envelope, the tube between the vessel and the envelope being maintained at a temperature between that of the vessel 31 and that at which decomposition of the vapour takes place as previously explained. The process is continued for about 2 minutes, the vessel 31 removed from the bath 32, and with the envelope still connected to the vacuum pump the oven is permitted to cool to about 250° C., the envelope, with the coating of boron nitride on its inner surface, then being removed from the oven and the lamp finally being completed as previously described.

In a lamp substantially as shown in FIGURE 1 additional heat-conserving means, such as one or more sleeves of transparent heat insulating material surrounding the discharge envelope or a light-transmissive heat reflecting film on the inner surface of the outer jacket, can be provided, if necessary, for assisting the envelope to be maintained at the required high operating temperature.

However the use of fused silica discharge envelopes coated internally, in accordance with the invention, with a film of boron nitride might render it possible in some cases to operate a sodium vapour electric discharge lamp at such high wattage loading that the required high envelope operating temperature is obtained without the necessity for evacuating the outer jacket.

We claim:
1. A pellucid article consisting essentially of a body of fused silica wherein at least part of the silica surface is coated with a continuous, adherent, substantially transparent film of boron nitride.
2. An article according to claim 1 wherein the body of fused silica is in the form of a hollow tube or vessel, and is coated over its internal surface with a continuous, adherent, substantially transparent film of boron nitride.
3. A metal vapour electric discharge lamp having a tubular discharge envelope of fused silica containing a pair of electrodes for the passage of the discharge and a quantity of alkali metal for providing at least part of the vapour filling in use of the lamp, and wherein the inner surface of the discharge envelope is coated with a continuous, adherent substantially transparent film of boron nitride.
4. A metal vapour electric discharge lamp according to claim 3 wherein the discharge envelope filling consists of rare gas for initiating a discharge between the electrodes together with sodium the vapour of which is excited to provide the main source of light in use of the lamp.
5. A metal vapour electric discharge lamp according to claim 3 wherein the discharge envelope contains both sodium and mercury for providing the metal vapour filling in use of the lamp.
6. A metal vapour electric discharge lamp according to claim 3 designed to operate with the metal vapour filling at super-atmospheric pressure in normal operation of the lamp.

References Cited by the Examiner
UNITED STATES PATENTS

| | | | |
|---|---|---|---|
| 2,841,733 | 7/1958 | Hodge | 313—184 |
| 2,848,641 | 8/1958 | Peterson | 313—184 |
| 2,966,426 | 12/1960 | Williams et al. | 117—106 |
| 3,063,858 | 11/1963 | Steeves | 117—5.1 |

FOREIGN PATENTS

| | | |
|---|---|---|
| 885,632 | 12/1961 | Great Britain. |

OTHER REFERENCES

Finlay et al.: Boron Nitride—An Unusual Refractory, Ceramic Bulletin, pp. 141–143, vol. 31, No. 4.

Powell et al.: "Vapor-Plating," 1955, John Wiley (N.Y.), (pp. 95–97, relied upon).

Schecter et al.: "Boron Hydrides and Related Compounds," Dept. of the Navy, Bureau of Aeronautics, January 1951 (declassified December 1953), (page 105, relied upon).

GEORGE N. WESTBY, *Primary Examiner.*